United States Patent [19]
Lloyd et al.

[11] 3,951,871
[45] Apr. 20, 1976

[54] DEFORMATION RESISTANT SHIELDING COMPOSITION

[75] Inventors: Keith A. Lloyd, Piscataway; Eugene J. Fisher, Brunswick; Lucio Ongchin, Warren, all of N.J.

[73] Assignee: Union Carbide Corporation, New York, N.Y.

[22] Filed: May 16, 1974

[21] Appl. No.: 470,644

[52] U.S. Cl. .............................. 252/511; 260/897 B; 174/102 SC
[51] Int. Cl.² ............................................ H01B 1/06
[58] Field of Search ................ 252/511; 260/897 B; 174/102 SC

[56] References Cited
UNITED STATES PATENTS

| | | | |
|---|---|---|---|
| 3,445,546 | 5/1969 | Pledger | 260/897 B |
| 3,735,025 | 5/1973 | Ling et al. | 174/102 SC X |
| 3,816,347 | 6/1974 | Lush | 252/511 |
| 3,849,333 | 11/1974 | Lloyd et al. | 252/511 |

*Primary Examiner*—Benjamin R. Padgett
*Assistant Examiner*—E. Suzanne Parr
*Attorney, Agent, or Firm*—James J. O'Connell

[57] ABSTRACT

A deformation resistant semi-conducting composition is formed from low density thermoplastic ethylene copolymer, carbon black, thermoplastic crystalline high density ethylene polymer or propylene resin and a thermoplastic elastomer.

The composition is useful as insulation shielding material or as conductor shielding material in high voltage wire and cable.

12 Claims, No Drawings

3,951,871

DEFORMATION RESISTANT SHIELDING COMPOSITION

BACKGROUND OF THE INVENTION

1. Field of the Invention

This invention relates to ethylene polymer based compositions which are used as shielding materials for electrical conductors which are used in high voltage wire and cable.

2. Description of the Prior Art

Electric wire and cable that is designed to carry electric current under a high voltage, i.e., ≥ 2K volts, usually comprises a core conductor which comprises one or more strands of a conducting metal or alloy such as copper or aluminum, a layer of a semi-conducting conductor shielding, a layer of insulation and a layer of semi-conducting insulation shield. A plurality of neutral wires which are usually made of tinned copped are embedded in or wrapped around the layer of semi-conducting insulation shield. These neutral wires form a concentric ring around the core of the cable.

These semi-conducting shielding compositions have been formed from ethylene polymers and conductive carbon black. However, the present service demands on these high voltage power cables requires the use therein, as the semiconducting insulation shield compositions, of insulation shielding compositions which are adaptable to function at the relatively high temperatures, of the order of 90° to 130°C., to which these cables can heat up to during the transmission of the electrical power through the cable. Unless these insulation shielding materials maintain their physical integrity at such high operating temperatures the concentric neutral wires which are embedded in or wrapped around the insulation shield are subject to penetrating the insulation shielding if the insulation shield experiences any significant amount of deformation as a result of external forces under these elevated use conditions. The ethylene polymer based compositions which have been filled with conductive carbon black and which have been used as the insulation shield for high voltage cables in the past tend to soften and deform precipitously at temperatures of the order of ≥ 70° to 90°C. due to fusion or melting of the ethylene polymer therein. Although a number of solutions to the problem have been proposed, not all of such solutions have provided an insulation shielding composition which will resist deformation at elevated temperatures, and which can be readily fabricated at elevated temperatures, and which will not suffer a concomitant deterioration in embrittlement temperature. These high voltage power cables are used in many instances outdoors, and above ground, in freezing and subfreezing temperatures, and the insulation shielding compositions, therefore, must also resist embrittlement under such external low temperature conditions.

Prior to the present invention, therefore, it has not be readily possible to provide semi-conducting insulation shielding compositions for high voltage power cables which can be readily processed at temperatures of the order of about 125° to 250°C., which will not suffer embrittlement at external temperatures of about 0° to −45°C. and which will resist deformation under internal in-service temperature conditions of about ≥ 100°-120°C.

SUMMARY OF THE INVENTION

An object of the present invention is to provide a readily processable, deformation resistant, semi-conducting ethylene polymer based insulation shielding composition for high voltage wire and cable.

Another object of the present invention is to provide high voltage wire and cable which is shielded with a composition which enables the cable to be used under internal elevated temperature conditions while being able to experience low embrittlement temperatures relative to its external environment.

These and other objects of the present invention are achieved with a semi-conducting insulation shielding composition which is formed from a selective combination of thermoplastic olefin polymers, conducting carbon black and elastomers.

DESCRIPTION OF THE PREFERRED EMBODIMENT

The objects of the present invention are achieved by employing as a semi-conducting insulation shield composition for high voltage wire and cable a composition of the following formulation, based on a total weight percent therein of 100:

a. about 25 to 60, and preferably, about 40 to 50, weight percent of thermoplastic low density ethylene copolymer, b. about 3 to 20, and preferably about 5 to 10, weight percent of thermoplastic crystalline propylene resin or high density ethylene polymer, c. about 5 to 35, and preferably about 10 to 20, weight percent of a thermoplastic elastomer, and d. about 30 to 50, and preferably about 32 to 40, weight percent of conducting carbon black, with the proviso that the weight ratio of such component b) to such component c) in such formulation is 1:1 to 1:3, and is preferably 1:1.5 to 1:2.5.

The insulation shielding compositions of the present invention are used in thermoplastic form, that is, they are not cross-linked. The insulation shielding compositions of the present invention have low embrittlement temperatures of the order of about −45° to −55°C. (as measured by ASTM D-746) and they are substantially resistant to deformation at temperatures of the order of ≥ 120°C. as indicated by their deformation values of about ≤ 1% at ≤ 120°C. to about 40% at ≤ 130°C., (as measured by the IPCEA method).

The insulation shielding compositions of the present invention also have the following good physical properties:

tensile strength values of about 1,000 to 3,000 pounds per square inch (psi) (as measured by ASTM D-412-68), ultimate elongation values of about 100 to 350 percent (as measured by ASTM D-412-68); and modulus values of about 20,000 to 50,000 psi (as measured by ASTM D-638-71).

ETHYLENE COPOLYMER

The low density ethylene copolymer which is to be used in the insulation shielding composition of the present invention is a normally solid (i.e. solid at 25°C.) thermoplastic resin having a density of about 0.910 to <0.940, and preferably of about 0.915 to 0.930, grams per cubic centimeter (as measured by ASTM 1505), and a melt index of about 1.5 to 50, and preferably of about 3.5 to 20, decigrams per minute (as measured by ASTM D-1238 at 44 psi test pressure).

The low density ethylene copolymer contains, based on the total weight of the copolymer, about 65 to 98, and preferably about 75 to 95, weight percent of interpolymerized ethylene and about 2 to 35, and preferably about 5 to 25, weight percent of one or more of the monomers vinyl acetate, vinyl propionate, vinyl butyrate, acrylic acid, methacrylic acid, and the $C_1$ to $C_8$ alkyl esters of such acids such as methyl acrylate, ethyl acrylate, methyl methacrylate, butyl methyl acrylate and 2-ethyl hexyl acrylate.

Up to about 5, and preferably about 1 to 3, weight percent of the interpolymerized ethylene in the low density ethylene copolymer may be replaced by one or more $C_3$ to $C_6$ monoolefins such as propylene, butene-1, pentene-1 and hexene-1.

The ethylene copolymers may be used individually or in combination with each other.

PROPYLENE RESIN OR HIGH DENSITY ETHYLENE POLYMER

The second thermoplastic resin component of the composition of the present invention may comprise one or more normally solid crystalline polymers having a melting point of $\geq 115°C$. and being one or more of propylene resins and high density polymers of ethylene.

The propylene resin may be an injection molding or extrusion grade isotactic homopolymer, or a copolymer containing $\geq 94$ weight percent of interpolymerized propylene and $> 0$ to 6 weight percent of one or more interpolymerized monomers consisting of ethylene and the $C_4$ to $C_6$ monoolefins such as butene-1, isobutene-1, and hexene-1. Such polymers of propylene usually have a melt index of about 2 to 40 decigrams per minute.

The high density polymer of ethylene has a density of $\geq 0.940$ and a melt index of about 2 to 30, and preferably of about 4 to 15, decigrams per minute. The high density polymer of ethylene may be a homopolymer or a copolymer of at least 94 weight percent of interpolymerized ethylene and up to 6 weight percent of one or more interpolymerized $C_3$ to $C_6$ monoolefins such as propylene, butene-1, pentene-1, and hexene-1.

These second thermoplastic resin components may be used individually or in combination with each other.

ELASTOMER

The third resin component of the compositions of the present invention is a normally solid elastomer. These thermoplastic elastomers are non-crystalline materials which, in an unvulcanized state, at room temperature, can be stretched repeatedly to at least twice their original length and, upon release of the stress, will return immediately with force to their approximate original length.

These elastomer resins include ethylene-propylene copolymers which contain, based on the total weight of such resins, about 10 to 90 weight percent of interpolymerized ethylene and about 10 to 90 weight percent of interpolymerized propylene.

The elastomer may also be an ethylene-propyleneter monomer terpolymer which contains, based on the total weight of the terpolymer, about 10 to <90 weight percent of interpolymerized ethylene, about 10 to <90 weight percent of interpolymerized propylene and about $> 0$ to 5 weight percent of interpolymerized termonomer. The ethylene and propylene are preferably used in the terpolymers in a weight ratio, to each other, of about 4:6 to 6:4, and most preferably of about 1:1. The termonomer is usually one or more conjugated or non-conjugated $C_4$ to $C_{10}$ polyenes such as 1,4- and 1,5-hexadiene, dicyclopentadiene, methyl cyclopentadiene and 5-ethylidene bicyclo[2.2.1]hept-2-ene.

Other elastomer resins which may be used are
butyl rubber,
polybutadiene,
polychlorobutadiene,
styrene-butadiene copolymers (block and random),
butadiene-acrylonitrile copolymers,
polyisoprene,
polyacrylates such as copolymers of methyl or ethylacrylate or methyl-acrylate with chloroethyl vinyl ether or acrylonitrile,
chlorosulfonated polyethylene, and
chlorinated polyethylene.

Carbon Black

Any conducting carbon black may be used in the compositions of the present invention, including channel blacks, oil furnace blacks and acetylene blacks. The carbon blacks should have a particle size of the order of about 10 to 60 millimicrons.

ADJUVANTS

In addition to the low density ethylene copolymer, the propylene resin or high density ethylene polymer, the elastomer, and the carbon black, the insulation compositions of the present invention may also contain one or more adjuvant materials of the types normally employed in ethylene polymer based insulation compositions.

The total amount of such adjuvants which are usually used amounts to no more than about 0.05 to 3 percent by weight based on the total weight of the insulation composition.

These adjuvants would include about 0.05 to 1.0 weight percent of one or more of the high temperature anti-oxidants which are commonly employed in ethylene polymer based insulation compositions. Such compounds would include
1,3,5-trimethyl-2,4,6-tris(3,5-ditertiary butyl-4-hydroxy benzyl)benzene,
1,3,5-tris(3,5-ditertiary butyl-4-hydroxy benzyl)-5-triazine-2,4,6-(1H,3H,5H)trione,
tetrakis [methylene-3-(3'.5'-di-t-butyl-4'-hydroxy phenyl)-propionate]methane, and
polymerized 1,2-dihydro-2,2,4-trimethyl quinoline.

The adjuvants may also include effective amounts, for the intended purposes of the adjuvant, of metal deactivators, lubricants, antiblock agents, waterproofing fillers, inorganic fillers and voltage stabilizers.

PROCESSING OF THE INSULATION COMPOSITIONS

All of the components of the insulation compositions of the present invention are usually blended or compounded together prior to their introduction into the extrusion device from which they are to be extruded onto the core electrical conductor or onto the insulation. The various resins and the other desired constituents may be blended together by any of the techniques used in the art to blend and compound thermoplastics to homogeneous masses. For instance, the components may be fluxed on a variety of apparatus including multi-roll mills, screw mills, continuous mixers, compounding extruders and Banbury mixers, or dissolved in mutual or compatible solvents.

When all the solid components of the composition are available in the form of a powder, or as small particles, the compositions are most conveniently prepared by first making a blend of the components, in a Banbury mixer or a continuous extruder, and then masticating this blend on a heated mill, for instance a two-roll mill, and the milling continued until an intimate mixture of the components is obtained. Alternatively, a master batch containing one or more of the resins and the carbon black and, if desired, some or all of the other components, may be added to the remaining mass of polymer. Where one or more of the resins are not available in powder form, the compositions may be made by introducing such resin(s) to the mill, masticating them until they form a band around one roll, after which a blend of the remaining components is added and the milling continued until an intimate mixture is obtained. The rolls are preferably maintained at a temperature which is within the range of about 50°C. to 150°C. The composition, in the form of a sheet, is removed from the mill and then brought into a form, typically dice-like pieces, suitable for subsequent processing.

After the various components of the insulation shielding compositions of the present invention are uniformly admixed and blended together, they may be readily processed in conventional extrusion apparatus temperatures of at about 125° to 250°C.

The following examples are merely illustrative of the present invention and are not intended as a limitation upon the scope thereof.

EXAMPLES 1–4

A series of four compositions were prepared to illustrate the novel and unexpected properties of the insulation shielding compositions of the present invention. Compositions 1–3, as described below, were comparative compositions. Composition 4, as described below, represents the novel insulation shielding compositions of the present invention.

The components of each of these four compositions are listed below in Table I. The compositions were formed by uniformly admixing the components thereof in a laboratory sized Banbury mixer. About 2,000 grams of each of such compositions was thus prepared.

To evaluate the properties of these compositions, 100 gram samples of each of the compositions were compression molded at 190°C. under a pressure of 10,000 pounds per square inch to form test plaques measuring 8 inches × 8 inches, which are also 50, 75 or 125 mils thick.

The test plaques were then physically tested in a variety of test procedures to demonstrate the substantially superior properties of the compositions of the present invention. These test results are listed below in Table II.

These test results indicate that the compositions of the present invention provide good ease of processing, low embrittlement temperatures and high resistance to deformation under load at elevated temperatures, without suffering any substantial loss in other physical properties which are essential in wire and cable insulation shielding compositions such as tensile strength, elongation and modulus.

TABLE I

| Component | Composition (in weight percent) | | | |
|---|---|---|---|---|
| | 1 | 2 | 3 | 4 |
| copolymer of ethylene and ethyl acrylate having a density of 0.93, a melt index of 4.5 and an ethyl acrylate content of 18 weight % | 62.8 | 52.8 | 52.8 | 42.8 |
| homopolymer of ethylene having a density of 0.962 | 0 | 0 | 10.0 | 10.0 |
| elastomeric terpolymer of ethylene, propylene and hexadiene (83/16/1 mol % ratio) | 0 | 10.0 | 0 | 10.0 |
| conductive carbon black | 37.0 | 37.0 | 37.0 | 37.0 |
| polymerized 1,2-dihydro-2,2,4-trimethyl quinoline | 0.2 | 0.2 | 0.2 | 0.2 |

TABLE II

| Physical Property | Composition | | | |
|---|---|---|---|---|
| | 1 | 2 | 3 | 4 |
| tensile strength, psi | 1450 | 1340 | 3000 | 1600 |
| Elongation, % | 320 | 290 | 10 | 250 |
| Modulus, psi | 24,000 | 19,300 | 39,000 | 45,000 |
| Brittle Temperature, °C. | −45 | −45 | −15 | −45 |
| Processing ease | Good | Good | Poor | Good |
| Deformation, % (under a 2000 gram load on 0.050" plaque) | | | | |
| at 50°C. | 0 | — | 0 | 0 |
| 75°C. | 0 | 3 | 0 | 0 |
| 90°C. | 45 | 30 | 2 | 0 |
| 105°C. | — | 70 | 22 | 0 |
| 120°C. | — | — | 50 | 1 |
| 130°C. | — | — | 83 | 40 |

These test results demonstrate that only composition 4 provides the desired combination of good processability, low embrittlement temperature and resistance to deformation under elevated temperatures.

Although compositions 1 and 2 provide good processability and a low embrittlement temperature they show precipitous deformation at temperatures as low as 75°–90°C.

Composition 3 shows some improved resistance to deformation at elevated temperatures but it has poor processability and has a relatively high embrittlement temperature.

EXAMPLES 5–6

A series of two additional compositions were prepared to illustrate the novel and unexpected properties of the insulation shielding compositions of the present invention. Compositions 1–2, as described above, and new composition 5 as described below, were comparative compositions. Composition 6, as described below, represents the novel insulation shielding compositions of the present invention.

The components of each of these four compositions are listed below in Table III. The compositions were formed and tested as disclosed above in Examples 1–4. The test results are reported in Table IV.

These test results indicate that the compositions of the present invention provide good ease of processing, low embrittlement temperatures and high resistance to deformation under load at elevated temperatures, without suffering any substantial loss in other physical properties which are essential in wire and cable insulation shielding compositions such as tensile strength, elongation and modulus.

TABLE III

| Component | Composition (in weight percent) | | | |
|---|---|---|---|---|
| | 1 | 2 | 5 | 6 |
| copolymer of ethylene and ethyl acrylate having a density of 0.93, a melt index of 4.5 and an ethyl acrylate content of 18 weight % | 62.8 | 52.8 | 52.8 | 47.8 |
| isotactic propylene homopolymer having a melt index of 8 | 0 | 0 | 10.0 | 5.0 |
| elastomeric terpolymer of ethylene, propylene and hexadiene (83/16/1 mol % ratio) | 0 | 10.0 | 0 | 10.0 |
| conductive carbon black | 37.0 | 37.0 | 37.0 | 37.0 |
| polymerized 1,2-dihydro-2,2,4-trimethyl quinoline | 0.2 | 0.2 | 0.2 | 0.2 |

TABLE IV

| Physical Property | Composition | | | |
|---|---|---|---|---|
| | 1 | 2 | 5 | 6 |
| tensile strength, psi | 1450 | 1340 | 3500 | 2070 |
| Elongation, % | 320 | 290 | 15 | 170 |
| Modulus, psi | 24,000 | 19,300 | 42,000 | 31,800 |
| Brittle Temperature, °C | −45 | −45 | −5 | −45 |
| Processing ease | Good | Good | Poor | Good |
| Deformation, % (under a 2000 gram load on 0.050"plaque) | | | | |
| at 75°C | 0 | 3 | 0 | 0 |
| 90°C | 45 | 30 | 0 | 0 |
| 105°C | — | 70 | 0 | 0 |
| 120°C | — | — | 0 | 1 |
| 130°C | — | — | 2 | 10 |

These test results demonstrate that only composition 6 provides the desired combination of good processability, low embrittlement temperature and resistance to deformation under elevated temperatures.

Although compositions 1 and 2 provide good processability and a low embrittlement temperature they show precipitous deformation at temperatures as low as 75°–90°C.

Composition 5 shows improved resistance to deformation at elevated temperatures but it has poor processability and has a relatively high embrittlement temperature.

The ethylene copolymer and the propylene homopolymer used in the examples each had a melting point of 115°C.

What is claimed is:

1. A semi-conducting insulation shielding composition comprising, based on the total weight of said composition,
    about 25 to 60 weight percent of thermoplastic ethylene copolymer having a density of 0.910 to <0.940 and containing about 2 to 35 weight percent, based on the total weight of said copolymer, of at least one comonomer selected from the group consisting of vinyl acetate, vinyl propionate, vinyl butyrate, acrylic acid, methacrylic acid, and the $C_1$ to $C_8$ alkyl esters of said acids,
    about 3 to 20 weight percent of a second thermoplastic crystalline resin having a melting point of ≥ 115°C and selected from the group consisting of propylene resin and ethylene polymer having a density of ≥ 0.940,
    said propylene resin being either an isotactic homopolymer, or a copolymer containing ≥ 94 weight percent of interpolymerized propylene and > 0 to 6 weight percent of one or more interpolymerized monomers selected from the group consisting of ethylene and $C_4$ to $C_6$ monoolefins, and
    said ethylene polymer having a density of ≥ 0.940 being either a homopolymer or a copolymer containing ≥ 94 weight percent of interpolymerized ethylene and >0 to 6 weight percent of one or more interpolymerized $C_3$ to $C_6$ monoolefins,
    about 5 to 35 weight percent of at least one thermoplastic elastomer, and
    about 30 to 50 weight percent of conducting carbon black,
    with the proviso that the weight ratio of said second resin to said elastomer is in the range of 1:1 to 1:3.

2. A composition as in claim 1 in which said ethylene copolymer having a density of 0.910 to <0.940 is a copolymer of ethylene and ethyl acrylate.

3. A composition as in claim 2 in which said second thermoplastic resin is an ethylene homopolymer.

4. A composition as in claim 3 in which said elastomer is a terpolymer of ethylene, propylene and hexadiene.

5. A composition as in claim 4 which comprises
    about 40 to 50 weight percent of thermoplastic copolymer of ethylene and ethylene acrylate having a density of about 0.915 to 0.930,
    about 5 to 10 weight percent of thermoplastic crystalline ethylene homopolymer having a density of ≥ 0.940,
    about 10 to 20 weight percent of, as said elastomer, ethylene-propylene-hexadiene terpolymer, and
    about 32 to 40 weight percent of conducting carbon black.

6. A composition as in claim 4 which comprises
    about 40 to 50 weight percent of thermoplastic copolymer of ethylene and ethyl acrylate having a density of about 0.915 to 0.930,
    about 5 to 10 weight percent of thermoplastic crystalline propylene homopolymer,
    about 10 to 20 weight percent of, as said elastomer, ethylene-propylene-hexadiene terpolymer, and
    about 32 to 40 weight percent of conducting carbon black.

7. High voltage wire or cable shielded with, as a shielding composition, the composition of claim 1.

8. High voltage wire or cable shielded with, as a shielding composition, the composition of claim 5.

9. High voltage wire or cable shielded with, as a shielding composition, the composition of claim 6.

10. A composition as in claim 1 in which said thermoplastic elastomer is a terpolymer of about 10 to < 90 weight percent of interpolymerized ethylene, about 10 to < 90 weight percent of interpolymerized propylene and > 0 to 5 weight percent of interpolymerized $C_4$ to $C_{10}$ polyene.

11. A composition as in claim 10 in which said polyene is a hexadiene.

12. A composition as in claim 10 in which said polyene is 5-ethylidene bicyclo[2.2.1]hept-2-ene.

* * * * *

UNITED STATES PATENT OFFICE
CERTIFICATE OF CORRECTION

Patent No. 3,951,871　　　　　　　Dated April 26, 1976

Inventor(s) K. A. Lloyd et al.

It is certified that error appears in the above-identified patent and that said Letters Patent are hereby corrected as shown below:

In the References Cited "Lush" should read --Luh--.

Column 1, line 40, --temperature-- should be inserted after "elevated".

Column 1, line 60, "be" should read --been--.

Column 7, line 47, "115°C" should read -- $\geq$ 115°C--.

Signed and Sealed this

Sixth Day of July 1976

[SEAL]

Attest:

RUTH C. MASON
*Attesting Officer*

C. MARSHALL DANN
*Commissioner of Patents and Trademarks*